March 31, 1970     J. M. SCHAEFER     3,504,263
SELF-OSCILLATING SWITCHING TYPE POWER SUPPLY
Filed Dec. 4, 1967
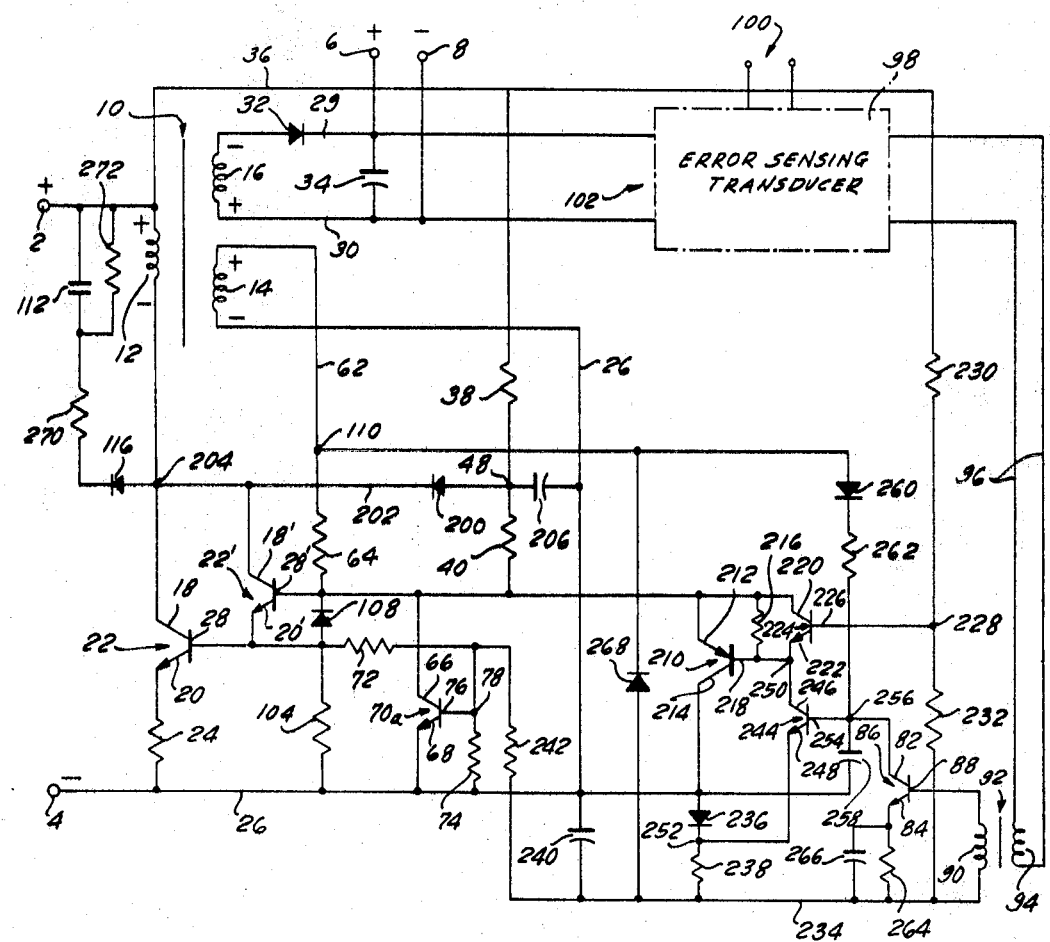
INVENTOR
JOHANNES M. SCHAEFER
BY
ATTORNEYS

United States Patent Office 3,504,263
Patented Mar. 31, 1970

3,504,263
SELF-OSCILLATING SWITCHING TYPE POWER SUPPLY
Johannes M. Schaefer, Grossweier, Germany, assignor to Technipower Incorporated, Ridgefield, Conn., a corporation of Connecticut
Filed Dec. 4, 1967, Ser. No. 687,901
Int. Cl. H02m *3/32*
U.S. Cl. 321—2                    14 Claims

ABSTRACT OF THE DISCLOSURE

A switching type power supply in which the control for the switching is feed-back connected to the output so as to produce a system which is inherently oscillatory between switch-on and switch-off conditions, improved by including the provision of separate feed-back bypass transistors respectively for voltage control and output current limiting, novel circuitry for controlling the operation of bypass transistors, novel circuitry for improving the stability of operation at light load, a new and simplified starting circuit, and circuitry for reliably linearizing the current limiting features, particularly at low loads.

---

The present invention relates to a switching type power supply of the type disclosed in my prior application Ser. No. 651,489 filed July 6, 1967 and having the same title, and assigned to the same assignee, as this application. The circuitry here disclosed and claimed operates on the same basic principle as that of the prior application—the circuitry constitutes an inherently self-oscillatory system controlled by feed-back from the output, the switching transistor therefor shifting between switch-on and switch-off conditions by virtue of that feed-back, and without having to provide any separate timing circuit. It has the advantages characteristic of such a system—adjustment and regulation of a desired output parameter is readily and accurately accomplished, and the input and the output are isolated by a transformer affected by frequencies much higher than line frequencies.

While the system as specifically disclosed in my aforementioned application Ser. No. 651,489 functioned in an exceedingly advantageous manner, particularly when compared with competitive prior art power supplies operating according to different principles, experience with that system gave rise to the realization that its functioning could be still further refined and improved, and that in some respects its already extremely simple circuitry could be still further simplified, with actual enhancement of its already favorable operating characteristics.

In the basic circuit as disclosed in the aforementioned prior application a single transistor is employed to variably bypass the feed-back energization of the switching transistor, that bypass transistor in turn being controlled both by the output current of the system—thus providing the basic oscillatory action and giving rise to a current-limiting feature—and the output voltage which is to be maintained at a predetermined value—thus providing a voltage regulation feature. The interaction between these two types of control, one depending upon output current and the other depending upon output voltage, made for some difficulty in individual accurate adjustment of each of these parameters, particularly because the output current and output voltage are interrelated in an especially complex manner by virtue of the mode of operation of the instant invention—the longer the on-periods of the primary circuit when compared to the off-periods, which are the periods of secondary conduction, the smaller is the average value of the secondary current as compared to its peak, it being said peak value which is sensed by the current control circuitry.

In accordance with the present invention two separate bypass transistors are provided, one controlled by the load current and the other by the output voltage. Each bypass transistor is provided with its own control circuit which can be independently adjusted, and hence far greater accuracy and reliability in providing both voltage regulation and current limiting is achieved.

The output voltage is a function of the duration of the on-periods of the system; the longer those on-periods, the greater is the output voltage. Consequently output voltage regulation requires a control of the duration of those periods in accordance with the sensed output voltage. In accordance with the present invention a new and more effective bypass control circuit is provided. It is characterized by being independent of load current sensing and of the characteristics of the switching transistors, by being singularly devoid of switching spikes and other noise phenomena, and therefore providing exceptionally accurate control.

As in the system of my prior application, the output current limiting control is derived from the current passing through the switching transistor while it is on. While this current is related to the output current of the system, it is not always accurately related thereto. This is particularly true when the output voltage is low; under these circumstances the ratio of the average value of the output current to the peak value of that current will rise, and thus produce an inaccuracy in the operation of the current limiting feature. In accordance with the present invention a special signal responsive to output voltage is derived and is caused to modify the action of the current limiting control circuit so as to cause more uniform action thereof on the actual system output current at low output voltages.

Under conditions of light load the stability of the oscillatory system tends to become marginal at best, thus restricting the lower limit of the range of controlled output voltage. In accordance with the present invention, a self-controlled bias circuit is provided which, when the output voltage is very low, provides a special signal effective to maintain the system in continued oscillation, that signal disappearing or becoming ineffective once the output voltage is at a higher value.

In the basic system of the prior application the starting circuit was appreciably complex. For example, it required its own transistor to disable the starting circuit once the overall circuit went into oscillation. In accordance with the present invention a greatly simplified starting circuit is provided, composed of passive rather than active elements.

As a result of the improvements which are described above in broad outline, the basic system of the aforementioned prior application Ser. No. 651,489 has its operation greatly improved as to ease of adjustment and accuracy and reliability of operation without any appreciable increase in, and in some instances an actual decrease in, complexity and expense of circuitry.

To the accomplishment of the above, and to such other objects as may hereinafter appear, the present invention relates to a power supply of the switching type as described in this specification, taken together with the accompanying drawing which is a circuit diagram of a preferred embodiment of the present invention.

GENERAL DESCRIPTION

The circuitry of the present invention is basically similar to that of the aforementioned prior application Ser. No. 651,489, and to indicate that basic similarity and more clearly point out the differences between the circuitry here disclosed and claimed and that of the prior application, I will in this specification utilize, so far as is convenient, the same reference numerals as used in said prior application for those parts of the circuit of this specification which have a direct counterpart in the circuit of said prior application, the circuit elements new in this application being given circuit numbers in the "200" numbers family.

The power supply has a pair of input terminals 2 and 4 which are adapted to be connected across a DC power supply and a pair of output terminals 6 and 8 at which the DC output is produced. The output at the terminals 6 and 8 may be nominally the same as or different from the input at the terminals 2 and 4 with respect to voltage and/or current, depending in part on the turns ratio between the operative winding sections of a transformer generally designated 10, which has first (input), second (feedback) and third (output) winding sections 12, 14 and 16 respectively, here shown for purposes of lilustration as separate windings. The first or input winding section 12 is connected across the input terminals 2 and 4 in series with the output electrodes 18 and 20 of a switching transistor generally designated 22, a resistor 24 being connected between the emitter 20 of the transistor 22 and the ground or reference potential line 26 connected to the input terminal 4. For power handling purposes a second switching transistor 22', having output terminals 18' and 20' respectively, is adapted to be connected in Darlington fashion with the transistor 22, the emitter 20' of the transistor 22' being connected to the base or control electrode 28 of the transistor 22. The transistor 22' has a corresponding control electrode 28'. For purposes of clarity in the succeeding discussion, only the switching transistor 22 will be specifically referred to, and it will be understood that in fact such reference is to one or more individual transistors which function cooperatively.

The third or output winding section 16 is connected to the output electrodes 6 and 8 via leads 29 and 30, with rectifier 32 being connected in lead 28 and with capacitor 34 connected across the output terminals 6 and 8.

Lead 36 and resistors 38 and 40 connect the positive input terminal 2 to the base 28 of the switching transistor 22, thus providing initial starting current therefor. A point 48 located between the resistors 38 and 40 is connected by rectifier 200 and lead 202 to point 204 at the lower end of winding section 12, the output electrodes 18 and 18' of the switching transistors 22 and 22' being connected to the point 204. A capacitor 206 is connected between the point 48 and the reference voltage line 26.

One end of the winding section 14 is connected to reference potential line 26. Its other end is connected to lead 62. Connected in series between lead 62 and reference lead 26 is resistor 64 and the output electrodes 66 and 68 of bypass transistor 70a, which corresponds to the bypass transistor 70 of the aforementioned prior application Ser. No. 651,489 only insofar as the current limiting actions of that prior transistor 70 are concerned. The bypass action of the transistor 70a derives from the fact that its output electrodes 66 and 68 connect the control electrode 28' of switching transistor 22' (and hence, because of the Darlington connection, the control electrode 28 of the switching transistor 22) to the reference voltage line 26. A pair of resistors 72 and 74 are connected between the control electrode 28 of the switching transistor 22 and the reference voltage line 26. A rectifier 108 is connected between the control electrodes 28 and 28' of the switching transistors 22 and 22' respectively. The control electrode 76 of the transistor 70a is connected to point 78 between resistors 72 and 74. Resistor 104 is connected between the control electrode 28 of the transistor 22 and the reference voltage line 26.

A second bypass transistor 210 has control electrodes 212 and 214 which are connected between the control electrode 28' of the switching transistor 22' (and, because of the Darlington connection, the control electrode 28 of the switching transistor 22) and the reference potential line 26. The bypass transistor 210, as will be seen, performs the output voltage control functions of the bypass transistor 70 of the aforementioned prior application. A resistor 216 connects the output electrode 212 of the transistor 210 with the control electrode 218 of that transistor. The resistor 216 is bypassed by the output electrodes 220 and 222 of a transistor 224 having a control electrode 226, the latter being connected to point 228 connected between resistors 230 and 232, those resistors defining a voltage dividing network extending between lead 36 and line 234, the latter being connected to reference voltage line 26 by rectifier 236 and resistor 238 connected in series and, in parallel therewith, capacitor 240. A resistor 242 connects line 234 with point 78 and the control electrode 76 of bypass transistor 70a.

A transistor 244 has output electrodes 246 and 248 which are connected between points 250 and 252; point 250 is connected to the control electrode 218 of the bypass transistor 210 and point 252 is located between the rectifier 236 and resistor 238. The control electrode 254 of transistor 244 is connected to point 256, which is in turn connected by capacitor 258 to the reference voltage line 26. Rectifier 260 and resistor 262 connect point 256 to lead 62.

The point 256 is bypassed to line 34 by the output electrodes 82 and 84 of transistor 86, a resistor 264 and a capacitor 266 being connected in parallel with one another between the output electrode 84 and the line 234. The control electrode 88 of the transistor 86 is connected to the line 234 by winding 90 of transformer 92, the other winding 94 of which is connected by leads 96 to the output of an error sensing transducer 98 of any appropriate design. That transducer has two inputs 100 and 102, the input 100 being connected to any appropriate reference voltage source and the input 102 being connected to the output terminals 6 and 8, thereby to sense the output voltage.

Rectifier 268 is connected between lead 62 and line 234. Capacitor 112 and resistor 270 are connected in series between the input terminal 2 and one end of rectifier 116, the other end of that rectifier being connected to point 204. A resistor 272 shunts capacitor 112.

The basic mode of operation of the system is as follows: When the terminals 2 and 4 are connected to an appropriate source of power the control electrode 28 of the switching transistor 22 is supplied with base current through lead 36 and resistors 38 and 40, and the output circuit of transistor 22 is rendered conductive, the transistor 22 thus being placed in its "on" condition. Current will thus flow and build up through the first winding section 12 and the switching transistor 22, producing a voltage in the winding 12 with the polarity indicated on the drawing, and this will in turn induce voltages in the second and third winding sections 14 and 16 respectively with the polarities there indicated. As the positive voltage at the upper end of the second winding section 14 builds up, this voltage is transferred to the base of the switching transistor 22, thus driving it to saturation and ensuring that it turns substantially fully on. The current through the winding section 12 and the switching transistor 22 will continue to rise. That current flows through resistor 24, and as it increases the upper end of resistor 24 will become increasingly positive with respect to the reference potential. Thus the voltage of the control electrode 28 will rise and a given proportion of that voltage, as determined by the relative values of the resistors 72 and 74 which define a voltage divider, will be applied to the control electrode 76 of the transistor 70a. As the potential of the control electrode 76 rises, the output circuit between the electrodes 66 and 68 of the transistor 70a becomes conductive, and hence some of the current for the base or control electrode 28 will be bypassed to ground via the transistor 70a. The conductivity of the output circuit of the switching transistor 22 will therefore be reduced, the voltage in the output circuit of the transistor 22 will increase, and the current through the first winding section 12 will start to decrease. This will in turn produce less of a positive voltage at the upper end of the second winding section 14, this will further reduce the energization of the control electrode 28 of the switching transistor 22, and this effect will be progressive until the switching transistor 22 shifts to an "off" condition. (The operation is here described solely with regard to the current limiting or control feature produced by the bypass transistor 70a.)

STARTING CIRCUIT DISABLING

If the starting impulse provided to the switching transistor control electrode 28 is permitted to continue to exist, system oscillation will be difficult to achieve, and in some instances may not occur, because of the necessity of overcoming that starting signal, which tends to cause the switching transistor 22 to be in an "on condition." In accordance with the present invention the means for disabling the starting signal as soon as the system is in a potentially oscillatory condition comprises the rectifier 200 and the capacitor 206. When the system is oscillatory the capacitor 206, charged by the starting impulse derived from positive terminal 2, lead 36 and resistor 38, is periodically discharged through rectifier 200, that discharge occurring whenever the first winding section 12 is in saturation. This periodical discharging of the capacitor 206 prevents the charge thereon from building up to any effective degree, and thus the capacitor 206 has no effect on the operation of the system while the system is oscillatory, the starting current being bypassed by the capacitor 206 and the rectifier 200. However, if there is no oscillation of the system, as will occur when the system is first energized or if previously existing oscillations should stop, the capacitor 206 will charge to an appreciable value, thereby to enable current to be provided through resistor 40 to energize the switching transistor 22 and cause the system to start oscillating.

SEPARATE OUTPUT VOLTAGE CONTROL BYPASS TRANSISTOR

The output voltage across the electrodes 6 and 8 charges the capacitor 34 and that output voltage is fed to the input 102 of the error sensing transducer 98, where that voltage is compared with the reference voltage input 100. The output of the error sensing transducer 98 is applied to the winding 94 of the transformer 92, thereby affecting the secondary winding 90, which in turn controls the energization of the control electrode 88 of the transistor 86. The output electrodes 82 and 84 of the transistor 86 are operatively connected to the control electrode 218 of the bypass transistor 210, by means to be described more in detail hereinafter. Thus bypass transistor 210 functions in basically the same manner as bypass transistor 70a in order to control the time duration of the on-periods of the switching transistor 22, except that it is controlled by output voltage rather than output current. By thus providing a separate bypass transistor 210 affected only by the output voltage of the system and not by the load current (except for the sophisticated voltage-current interaction described later in this specification) independent accurate and reliable control both of output voltage and of output current can be more readily achieved.

OUTPUT VOLTAGE BYPASS TIMING CONTROL

Output voltage control involves the accurate timing of the on- and off-periods of conduction of the switching transistor 22. This involves sensing precisely when current starts to flow in the primary winding section 12. In the system of the prior application (and in this system insofar as current limiting control is concerned) that sensing is derived from the voltage drop at the control electrode 28 of the switching transistor 22. This is not optimum for accurate voltage control because the voltage of that control electrode 28 is quite irregular at the instant when the transistor 22 becomes conductive and for a short but appreciable time thereafter. This irregularity in voltage appears to be caused by junction phenomena characteristic of the transistor 22. It gives rise to inaccuracy, and has also produced a tendency toward instability of the system at light load.

In order to avoid these disadvantages a novel timing arrangement for the voltage-effected bypass transistor 210 has been devised, this arrangement involving the transistor 244 and capacitor 258. The instant that current starts to flow through winding section 12, this corresponding to the turning on of the switching transistor 22, a voltage will be induced in the winding section 14 and that voltage will be active, through lead 62, rectifier 260 and resistor 262, to charge capacitor 258. Some of this charge current may be bypassed by transistor 86, the amount thus bypassed depending upon the signal received from the error sensing transducer 98. The greater that signal, representing a larger departure of the output voltage from its desired value, the more of the charging current for the capacitor 258 which will be bypassed, and hence the longer will be the time that it will take for the capacitor 258 to turn the transistor 244 on. When the transistor 244 turns on sufficiently, transistor 210 becomes sufficiently conductive to bypass a significant amount of the base current for switching transistor 22, thus causing that transistor 22 to turn off, thereby interrupting the primary current through the first winding section 12.

When the first winding section 12 is no longer being energized, that is to say, during the off-periods of the primary circuit, the energy stored in the third winding section 16 is discharged through rectifier 32 into the output capacitor 34. Similarly, the polarity of voltages in the second winding section 14 will be reversed from those shown in the drawings, the rectifier 260 will block, and the capacitor 258 will discharge to line 234 via transistor 86. As we have seen, the conductivity of the transistor 86 will be dependent upon the magnitude of the signal from the error sensing transducer 98, and hence the capacitor 258 will discharge more rapidly when the voltage error demands increase of the periods of primary conduction.

The timing carried out by the capacitor 258 in conjunction with the transistor 86 is thus seen to be independent of output current sensing and unaffected by peculiarities in the instantaneous voltage at the control electrode 28 of the switching transistor 22. Nevertheless the timing accurately and instantaneously senses the instant when the on-period starts and controls the action of the bypass transistor 210 so as to produce such timing control of the on-periods of the system as to compensate for detected errors in output voltage.

LINEARIZING CURRENT LIMITING ACTION

The line 234 is designed to be maintained at a reference voltage below that of the reference voltage line 26. That is accomplished as follows: The potential at point 110, connected to the upper end of the second winding section 14, is negative during the off-time of the primary circuit. When the potential at point 110 is negative relative to the reference voltage line 26 it charges capacitor 240 through rectifier 268, and the voltage across that capacitor 240 thus is related, in some predetermined ratio, to the output voltage of the system. The negative bias thus provided to the line 234 is used to provide appropriate bias for the output electrodes 248 and 84 of the transistors 244 and 86 respectively. The resistor 242 connects the control electrode 76 of bypass transistor 70a to the line 234.

The functioning of the transistor 70a in performing its current limiting feature is carried out independently of the state of conduction of the bypass transistor 210 which is controlled by the voltage error. However, since the ressitor 242 is connected to line 234, and since the voltage at line 234 will vary depending upon the output voltage, the functioning of the current limiting bypass transistor 70a is to some extent dependent upon the output voltage. This represents a control refinement which is one of the advantages of the system here disclosed and claimed. The current through the switching transistor 22, which in turn controls the voltage of the control electrode 28 and hence the action of the bypass transistor 70a, does not strictly represent a given output current in the third winding section 16. The lower the output voltage, the greater is the disparity between the current through transistor 22 and the output current of the system. This can perhaps best be appreciated by considering the difference between the average value of the output current and the peak value thereof. It is the peak value which is sensed by the control electrode 28 and which in turn controls the operation of the bypass transistor 70a. As the output voltage goes down, the periods of secondary conduction (off-periods in the primary) become longer in relation to the periods of primary conduction (on-periods in the primary), and hence the average value of the output current increases in proportion relative to the peak value thereof. Hence maintaining the peak current value constant at a limiting value (as is normally done by the control electrode 28 acting on the bypass transistor 70a) introduces an element of inaccuracy at low output voltages insofar as average output current is concerned. It is to compensate for this that the resistor 242 is connected to the line 234, which is in turn maintained at a potential below that of the reference voltage line 26 which corresponds to the output voltage. When the output voltage is appreciable the line 235 is more negative and hence more current flows through the resistor 242, thus increasing the peak current value required to operatively actuate the bypass transistor 70a. However, when the output voltage is low a lesser current flows through the resistor 242, and hence the bypass transistor 70a will be operatively energized at a lower peak current value.

LOW LOAD OSCILLATION STABILITY

Under conditions of very light load the on-times of the primary circuit are quite short. Under these conditions stability and continuity of oscillation is sometimes hard to maintain. Semi-instantaneous occurrences in the system, such as the switching of the load and the consequent momentary disappearance of transducer error signal (the output voltage will exceed the nominal voltage) will tend to cause oscillations to stop. To prevent oscillations from stopping each time that the load is switched, it is desirable to provide means to maintain the system in oscillation at a low level whether a transducer signal is present or not. To provide a simple constant energizing signal for this purpose has undesirable aspects; if the signal were slightly too high the system could not be made to operate at light or no load, whereas if the signal were not high enough oscillation would still be interrupted. To avoid this dilemma, there is provided in this system what may be termed a "self-controlled bias circuit." It utilizes the potential at the negative bias line 234, which, as we have seen, is representative of the output voltage, as the source of the bias signal. Resistors 230 and 232 define a voltage divider circuit between the line 234 and the potential at the positive input terminal 2. Hence the voltage at point 228 will vary as the output voltage varies. When the output voltage is above a predetermined value, the voltage at point 228 will be such as to render transistor 224 non-conductive. However, if the output voltage falls the voltage at point 228 will rise, the transistor 224 will be turned on, and hence the effect of transistor 244 on the bypass transistor 210 will be decreased, that is to say, the transistor 244 will have to be more conductive before the transistor 210 will be turned on and the switching transistors 22 will be turned off. This means that the on-periods of the primary circuit will be increased, raising the output voltage and maintaining the system in oscillation. This effect of the transistor 224 will terminate when the output voltage rises to a predetermined degree, since under those conditions, as we have seen, the point 228 will be at such a potential as to render the transistor 224 non-conductive. Thus during conditions of normal operation, with the error sensing transducer 98 in undisturbed operation, the transducer signal will be effective to cause the output voltage to rise to a level within the range of proper oscillatory control, and when, in the case, for example, of transient or start-up conditions, there is no signal from the error sensing transducer and the output voltage is so low as to threaten the continuity of oscillation of the system, the transistor 224 will so modify the control of the bypass transistor 210 as to ensure that the output voltage rises to a value such as to maintain system oscillation.

SUMMARY

Thus by providing a new and greatly simplified starting circuit, by providing separate bypass transistors for current limiting and voltage control respectively, by providing a timing system for the voltage bypass control which is of improved accuracy and is not affected by signal irregularities, by modifying the current limiting system so as to compensate for the effect of output voltage changes, and by providing a self-controlled biasing circuit for maintaining the system in oscillation during transient irregularities in the control signal, the operation of a power supply of the type here involved has been greatly improved as to reliability and accuracy, particularly under special operating conditions. This has been accomplished by simple and effective circuitry and is characterized in some instances by increased simplicity and inexpensiveness when compared with the comparable system of my aforementioned prior application. These improvements function individually and cooperatively to produce a power supply of greatly expanded accuracy and range of utility.

While but a single embodiment of the present invention has been here specifically disclosed, it will be apparent that many changes may be made therein, all within the scope of the instant invention.

I claim:

1. In a DC power supply comprising a DC power source, a transformer having first, second and third winding sections, an output circuit connected to said third winding section via a rectifier, first transistor means having output electrode means and control electrode means and adapted to be operated in a switching mode through energization of its control electrode means, said first winding section and said output electrode means of said first transistor means being connected across said power source, biasing means including said second winding section operatively connected to said control electrode means of said first transistor means for providing a normal bias thereto so as to put it in a switch-on and switch-off mode respectively when the voltage across said first winding section is in a given sense and the opposite sense respectively, and means operatively connecting said winding sections and said first transistor means so as to cause said first transistor means to oscillate between said switch-on and switch-off modes, causing voltages in opposite senses to appear across said winding sections and producing a voltage output in said output circuit, sensing means for sensing the output voltage of said output circuit, bypass means for said biasing means, and an operative connection between said sensing means and said bypass means effective to modify the action of the latter as the former varies; the improvement which comprises signal means for sensing when said output voltage is below a predetermined value and producing a signal in accordance with such sensing, and means operatively connecting said signal means to said bypass means and effective to inhibit the action of said bypass means when said signal is present, thereby to maintain said first transistor means in oscillation at a predetermined level.

2. The power supply of claim 1, in which said bypass means comprises a transistor having a control electrode, and means connecting said second winding section and said sensing means to said control electrode, and in which said means operatively connecting said signal means to said bypass means comprises a second transistor having output electrodes connected to said control electrode of said bypass transistor and having a control electrode to which said signal means is connected.

3. The power supply of claim 1, in which said means operatively connecting said signal means to said bypass means comprises a transistor having output electrodes connected to said bypass means and having a control electrode to which said signal means is connected.

4. In a DC power supply comprising a DC power source, a transformer having first, second and third winding sections, an output circuit connected to said third winding section via a rectifier, first transistor means having output electrode means and control electrode means and adapted to be operated in a switching mode through energization of its control electrode means, said first winding section and said output electrode means of said first transistor means being connected across said power source, biasing means including said second winding section operatively connected to said control electrode means of said first transistor means for providing a bias thereto so as to put it in a switch-on and switch-off mode respectively when the voltage across said first winding section is in a given sense and the opposite sense respectively, and means operatively connecting said winding sections and said first transistor means to oscillate between said switch-on and switch-off modes, causing voltages in opposite senses to appear across said winding sections and producing a voltage output in said output circuit; the improvement in a starting circuit therefore which comprises means for supplying a starting signal to said first transistor means, a capacitor connected between said starting signal supplying means and a reference potential, and discharging means operatively connected to said capacitor and to said first winding section and effective to discharge said capacitor when said first winding section carries an oscillating current.

5. The power supply of claim 4, in which said discharging means comprises a rectifier connected between said capacitor and said first winding section.

6. In a DC power supply comprising a DC power source, a transformer having first, second and third winding sections an output circuit connected to said third winding section via a rectifier, first transistor means having output electrode means and control electrode means and adapted to be operated in a switching mode through energization of its control electrode means, said first winding section and said output electrode means of said first transistor means being connected across said power source, biasing means including said second winding section operatively connected to said control electrode means of said first transistor means for providing a bias thereto so as to put it in a switch-on and switch-off mode respectively when the voltage across said first winding section is in a given sense and the opposite sense respectively, means operatively connecting said winding sections and said first transistor means so as to cause said first transistor means to oscillate between said switch-on and switch-off modes, causing voltages in opposite senses to appear across said winding sections and producing a voltage output in said output circuit, means for sensing the current through said first winding and producing a signal, and a bypass transistor having output electrodes connected in bypass relationship with said control electrode means of said first transistor means and having a control electrode operatively connected to said sensing means and receiving said current signal; the improvement which comprises means for producing a signal representative of the voltage of said output circuit, and means for connecting said voltage signal to said control electrode of said bypass transistor in a sense opposite to that of said current signal, thereby to require a greater value of current in said first winding to turn said bypass transistor on at a discrete value of output voltage than when said output voltage is substantially zero.

7. In a DC power supply comprising a DC power source, a transformer having first, second and third winding sections, an output circuit connected to said third winding section via a rectifier, first transistor means having output electrode means and control electrode means and adapted to be operated in a switching mode through energization of its control electrode means, said first winding section and said output electrode means of said first transistor means being connected across said power source, biasing means including said second winding section operatively connected to said control electrode means of said first transistor means for providing a bias thereto so as to put it in a switch-on and switch-off mode respectively when the voltage across said first winding section is in a given sense and the opposite sense respectively, and means operatively connecting said winding sections and said first transistor means so as to cause said first transistor means to oscillate between said switch-on and switch-off modes, causing voltages in opposite senses to appear across said winding sections and producing a voltage output in said output circuit; the improvement which comprises bypass means for said biasing means comprising a bypass transistor having output electrodes connected in bypass relationship with the control electrode means of said first transistor means and having a control electrode, a capacitor connected to said biasing means in chargeable relation thereto, a second transistor having output electrodes connected across said capacitor and having a control electrode, means for sensing the voltage of the output in said output circuit, means for operatively connecting said sensing means to said control electrode of said second transistor, and an operative connection between said capacitor and said control electrode of said bypass transistor.

8. The power supply of claim 7, in which a rectifier is interposed between said biasing means and said capacitor.

9. The power supply of claim 8, in which said operative connection between said capacitor and said control electrode of said bypass transistor comprises a third transistor having output electrodes operatively connected in bypass relation to said control electrode of said bypass transistor and having a control electrode operatively connected to said capacitor.

10. The power supply of claim 7, in which said operative connection between said capacitor and said control electrode of said bypass transistor comprises a third transistor having output electrodes operatively connected in bypass relation to said control electrode of said bypass transistor and having a control electrode operatively connected to said capacitor.

11. In a DC power supply comprising a DC power source, a transformer having first, second and third winding sections, an output circuit connected to said third winding section via a rectifier, first transistor means having output electrode means and control electrode means and adapted to be operated in a switching mode through energization of its control electrode means, said first winding section and said output electrode means of said first transistor means being connected across said power source biasing means including said second winding section operatively connected to said control electrode means of said first transistor means for providing a bias thereto so as to put it in a switch-on and switch-off mode respectively when the voltage across said first winding section is in a given sense and the opposite sense respectively, and means operatively connecting said winding sections and said first transistor means so as to cause said first transistor means to oscillate between said switch-on and switch-off modes, causing voltages in opposite senses to appear across said winding sections and producing a voltage output in said output circuit; the improvement which comprises first and second bypass means for said biasing means comprising second and third transistors respectively, each having output electrodes connected in bypass relationship with the control electrode means of said first transistor means and each having a control electrode, first sensing means for sensing the current through said first winding, means operatively connecting said first sensing means to said control electrode of said second transistor, second sensing means for sensing the voltage of the output in said output circuit, and means operatively connecting said second sensing means to said control electrode of said third transistor, in which said means for operatively connecting said second sensing means to said control electrode of said third transistor comprises a capacitor connected to said biasing means in chargeable relation thereto, a fourth transistor having output electrodes connected across said capacitor and having a control electrode connected to said second sensing means, and an operative connection between said capacitor and said control electrode of said third transistor.

12. The power supply of claim 11, in which said capacitor is connected to said biasing means via rectifier.

13. The power supply of claim 12, in which the operative connection between said capacitor and said control electrode of said third transistor comprises a fifth transistor having output electrodes operatively connected in bypass relation to said control electrode of said third transistor and having a control electrode operatively connected to said capacitor.

14. The power supply of claim 11, in which the operative connection between said capacitor and said control electrode of said third transistor comprises a fifth transistor having output electrodes operatively connected in bypass relation to said control electrode of said third transistor and having a control electrode operatively connected to said capacitor.

References Cited

UNITED STATES PATENTS

| 2,791,739 | 5/1957 | Light | 321—2 |
| 2,946,924 | 7/1960 | Gerlach et al. | 321—2 X |
| 3,400,319 | 9/1968 | Stich | 321—2 |
| 3,417,306 | 12/1968 | Knak | 321—2 X |
| 3,419,781 | 12/1968 | Jullien-Davin | 321—2 |
| 3,435,320 | 3/1969 | Lee et al. | 321—2 |

FOREIGN PATENTS 949,628 2/1964 Great Britain.

LEE T. HIX, Primary Examiner

W. H. BEHA, JR., Assistant Examiner

U.S. Cl. X.R.

321—19; 331—112